UNITED STATES PATENT OFFICE.

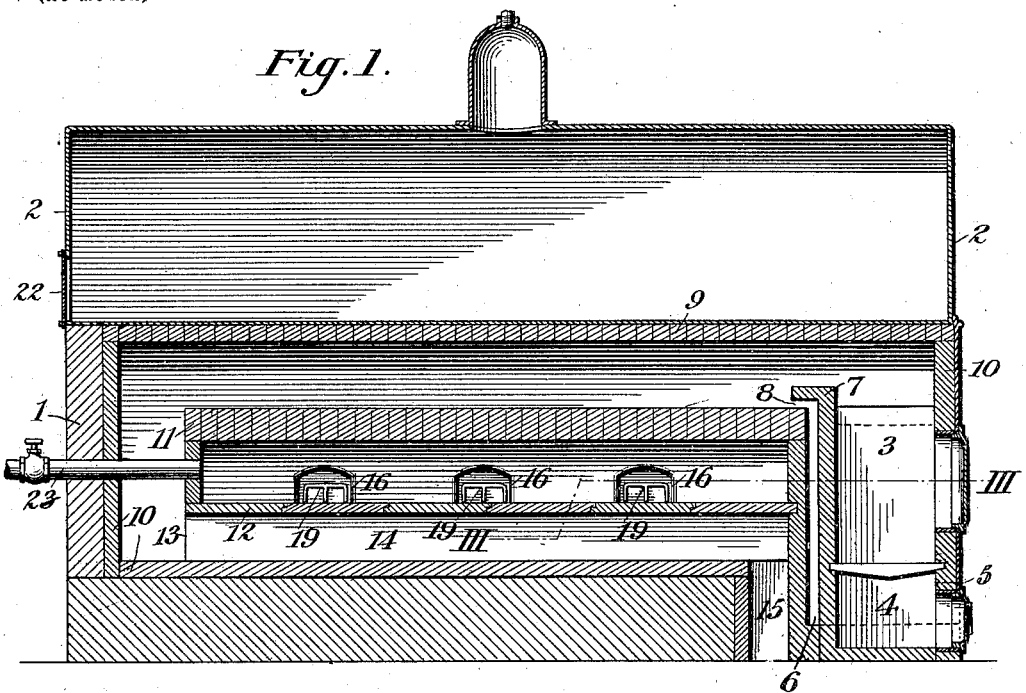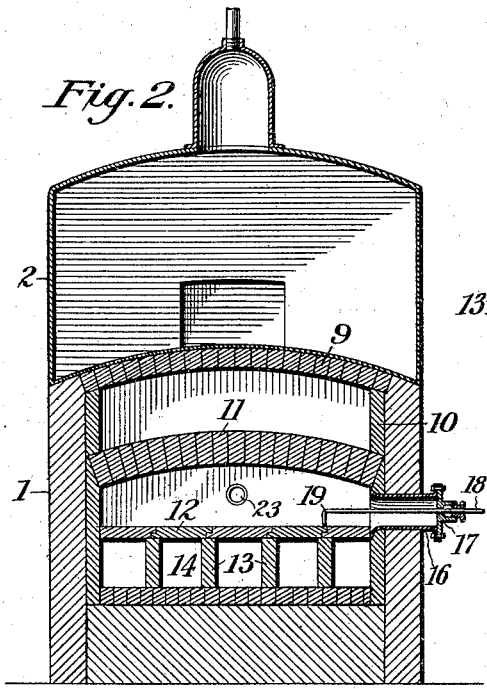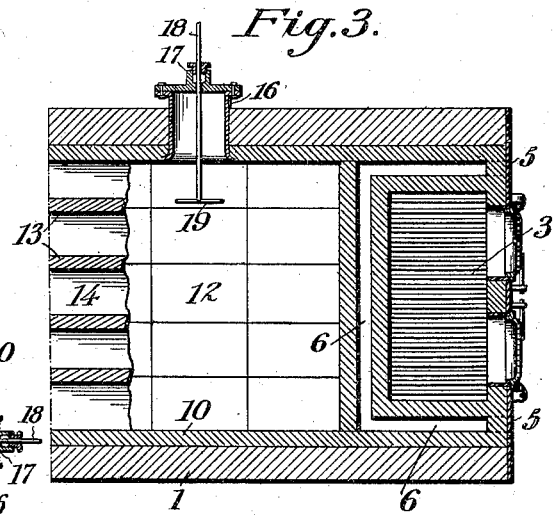

ALEXANDER SYDNEY RAMAGE, OF CLEVELAND, OHIO.

PROCESS OF TREATING FERROUS LIQUORS.

SPECIFICATION forming part of Letters Patent No. 708,585, dated September 9, 1902.

Application filed February 17, 1902. Serial No. 94,472. (No specimens.)

*To all whom it may concern:*

Be it known that I, ALEXANDER SYDNEY RAMAGE, a citizen of the United States, residing at Cleveland, State of Ohio, have invented new and useful Improvements in Processes of Treating Ferrous Liquors, of which the following is a specification.

My invention relates to the treatment of ferrous liquors to recover therefrom the iron in the form of a pigment and the acid as a salt of an alkali or an alkaline-earth metal.

The particular ferrous liquor for which the process has been commercially utilized is a waste solution resulting from the pickling of iron. This pickling liquor contains ferrous sulfate or ferrous chlorid, depending on the acid which has been used in pickling, and may contain a small amount of the free acid.

In carrying out the process the free acid in the liquor, if any, is neutralized by any convenient reagent, such as sodium carbonate. The ferrous salt in solution is then oxidized by the injection of air or air and steam in a finely-divided condition, being thereby converted into a basic ferric salt. This basic salt is hydrolized by dissolving it in sufficient water to effect decomposition of the salt into its acid and basic ferric hydrate. In order that all of the salt in solution may be thus hydrolized, the resulting acid is neutralized as set free or from time to time, as by the addition of a hydrate or carbonate of an alkali or an alkaline-earth metal. The hydrated basic ferric oxid thus precipitated is of bright-yellow color and has the composition $Fe_2O_3$, $Fe_2(OH)_6$ and contains a large amount of occluded oxygen. The resulting sulfate or chlorid solution after separation by a filter or otherwise from the ferric oxid is treated to recover the salts in solution. To effect this result, any remaining traces of iron are removed by the use of an active oxidizing agent, such as bleaching-powder or otherwise. The solution is then concentrated by evaporation and the salt crystallized out. If the original solution contained ferrous sulfate and sodium hydrate or carbonate be used to neutralize, the resulting hydrated sodium sulfate or Glauber salt is calcined to sodium sulfate.

The general process of producing a yellow oxid, as outlined above, is described and claimed in my United States Patent No. 691,324. This invention is particularly concerned with the calcination of the yellow ferric oxid to produce therefrom various shades of red and the use of apparatus to effect this calcination simultaneously with the evaporation of the final solution and calcination of the recovered salt, the basic oxid, with its occluded oxygen, serving as a fuel to assist in evaporation. For the purpose of carrying out these additional steps the apparatus shown in the accompanying drawings may be employed, in which drawings—

Figure 1 is a vertical longitudinal section. Fig. 2 is a transverse vertical section, and Fig. 3 is a detail horizontal section on line III III of Fig. 1.

The apparatus consists in general of a muffle-furnace 1, above which is an evaporating-pan 2, preferably covered to enable a vacuum to be maintained therein and having a door 22. The furnace is provided with the usual fuel-chamber 3 and ash-pit 4, only sufficient air being admitted beneath the grate to liberate producer-gas from the coal placed upon the grate. The air to effect combustion of this gas is introduced through openings 5 at each side of the ash-pit and thence enters a narrow vertical space 6, surrounding the chamber on three sides, and is therein heated. It thence passes out from the upper portion of the bridge-wall 7, preferably through a horizontal slit 8, extending away from the fuel-chamber. The roof of the furnace, upon which the evaporating-pan rests, consists of an arch of fire-bricks 9. The body of the furnace consists of common brick, having throughout a lining of fire-brick 10 to resist the action of the products of combustion. The calcining-muffle has an arched roof 11, of fire-brick, sides and ends, of fire-brick, and a bottom 12, of tiles. These tiles preferably have interlocking rabbets at their meeting edges and are supported upon fire-brick partitions 13, which extend longitudinally of the furnace, leaving intermediate flues 14. The products of combustion sweep over the top of the muffle, then down past its rear end, and thence through the flues beneath its tile bottom, escaping downwardly through the stack-flue 15. A number of charging-openings extend horizontally through one wall of the furnace into the muffle, these openings having cast-iron door-frames 16 and doors 17. The doors are secured in place by bolts or otherwise, and each has a central opening through which passes the handle 18 of a rabble 19. In the use of this apparatus the vacuum-pan 2 is filled with the purified sodium sulfate or other solution and the muffle is charged with the yellow basic ferric oxid. The usual charge of oxid for a muffle having a bed seven feet wide and fifteen feet long is two thousand pounds, which gives a layer of seven to eight inches in depth. The color of the red oxid produced by calcination depends on the mode of treatment. For example, for the production of a scarlet red the yellow oxid is heated for one hour at a temperature below a dull red to drive off the occluded gases. The temperature is then raised to and maintained at a dull red, the calcination being finished at the end of three hours. For the production of an Indian red the charge is heated to a bright red, whereupon the temperature of the mass suddenly rises to a white heat, giving a perfect product in fifteen minutes. No air is admitted in carrying out either of the above methods; but the mass of oxid should be stirred from time to time.

The yellow hydrated basic ferric oxid contains a large amount of occluded oxygen, as shown by the fact that it very quickly dries raw linseed-oil. The fact that the yellow oxid can be calcined into red in the absence of air also shows that the further oxidation indicated by this change in color is effected by occluded oxygen. The yellow oxid, with its occluded oxygen, when raised to a temperature sufficient to start the reaction is by its own oxidation raised to incandescence and gives off a large amount of heat. In the above apparatus this fact is taken advantage of by using the heat so evolved to assist in evaporating the contents of the vacuum-pan, and the amount of fuel required is thereby materially diminished. For the production of certain shades of red it is preferable to maintain a partial vacuum in the muffle while calcining by means of valved pipe 23.

The term "alkali metal" as used in the description and claims is intended to include sodium, potassium, and ammonium, the term "alkaline-earth metal" to include calcium, strontium, barium, and magnesium. As this process contemplates fixing the acid radical of the ferrous liquor in the form of a soluble salt, it is obvious that the use of calcium, strontium, and barium as a neutralizing base is precluded with sulfate solutions.

When the solution which is placed in the evaporating-pan 2 contains sodium sulfate, the resulting Glauber salt may be calcined in the same vessel and removed through the door 22 at the end.

I claim—

1. The process of treating ferrous liquors, which consists in precipitating therefrom a yellow, hydrated, basic, ferric oxid, containing occluded oxygen, and calcining said oxid by heating it to a temperature sufficient to cause the occluded oxygen to react on the oxid with evolution of heat, as set forth.

2. The process of treating ferrous liquors, which consists in precipitating therefrom a yellow, hydrated, basic, ferric oxid, containing occluded oxygen, and calcining said oxid by heating it, with exclusion of air, to a temperature sufficient to cause the occluded oxygen to react on the oxid with evolution of heat, as set forth.

3. The process of treating ferrous liquors, which consists in precipitating therefrom a yellow, hydrated, basic, ferric oxid, containing occluded oxygen, calcining said oxid by heating it to a temperature sufficient to cause the occluded oxygen to react on the oxid with evolution of heat, and stirring the oxid during calcination, as set forth.

4. The process of treating ferrous liquors, which consists in precipitating therefrom a yellow, hydrated, basic, ferric oxid, containing occluded oxygen, calcining said oxid by heating it, with exclusion of air, to a temperature sufficient to cause the occluded oxygen to react on the oxid with evolution of heat, and stirring the oxid during calcination, as set forth.

5. The process of treating ferrous liquors, which consists in precipitating therefrom a yellow, hydrated, basic, ferric oxid, recovering the acid radical as a solution of a salt of an alkali or alkaline-earth metal, placing said oxid and solution in proximity, and heating said oxid to a temperature sufficient to cause the occluded oxygen to react on the oxid with evolution of heat, thereby simultaneously calcining the oxid and supplying heat to evaporate the solution, as set forth.

6. The process of treating ferrous liquors, which consists in precipitating therefrom a yellow, hydrated, basic, ferric oxid, recovering the acid radical as a solution of a salt of an alkali or alkaline-earth metal, placing said oxid and solution in proximity, and heating said oxid, with exclusion of air, to a temperature sufficient to cause the occluded oxygen to react on the oxid with evolution of heat, thereby simultaneously calcining the acid and supplying heat to evaporate the solution, as set forth.

7. The process of treating ferrous liquors, which consists in precipitating therefrom a yellow, hydrated, basic, ferric oxid, recovering the acid radical as a solution of a salt of an alkali or alkaline earth-metal, placing said oxid and solution in proximity, heating said oxid to a temperature sufficient to cause the occluded oxygen to react on the oxid with evolution of heat, thereby simultaneously calcining the oxid and supplying heat to evaporate the solution, and stirring the oxid during calcination, as set forth.

8. The process of treating ferrous liquors, which consists in precipitating therefrom a yellow, hydrated, basic, ferric oxid, recovering the acid radical as a solution of a salt of an alkali or alkaline-earth metal, placing said oxid and solution in proximity, heating said oxid, with exclusion of air, to a temperature sufficient to cause the occluded oxygen to react on the oxid with evolution of heat, thereby simultaneously calcining the acid and supplying heat to evaporate the solution, and stirring the oxid during calcination, as set forth.

In testimony whereof I affix my signature in presence of two witnesses.

ALEXANDER SYDNEY RAMAGE.

Witnesses:
A. T. HATCH,
W. S. ROGERS.